US012347454B1

United States Patent
Erden et al.

(10) Patent No.: US 12,347,454 B1
(45) Date of Patent: Jul. 1, 2025

(54) HIGH-DENSITY ARCHIVAL STORAGE USING CONVENTIONAL HARD DISK DRIVE ARCHITECTURE

(71) Applicant: SEAGATE TECHNOLOGY LLC, Fremont, CA (US)

(72) Inventors: Mehmet Fatih Erden, St. Louis Park, MN (US); John W. Dykes, Eden Prairie, MN (US); Jon D. Trantham, Chanhassen, MN (US); Edward Charles Gage, Excelsior, MN (US); Riyan Alex Mendonsa, Edina, MN (US); John Michael Bent, Los Alamos, NM (US); Joshua Ward Christensen, Savage, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/672,636

(22) Filed: May 23, 2024

(51) Int. Cl.
  *G11B 5/60* (2006.01)
  *G11B 5/012* (2006.01)
  *G11B 20/10* (2006.01)

(52) U.S. Cl.
  CPC ........ *G11B 20/10481* (2013.01); *G11B 5/012* (2013.01)

(58) Field of Classification Search
  CPC ........ G11B 5/6011; G11B 5/012; G11B 5/02; G11B 5/588; G11B 5/00813; G11B 5/5922; G11B 15/1841; G11B 15/473; G11B 20/183
  USPC .................................................. 360/75
  See application file for complete search history.

(56) References Cited

U.S. PATENT DOCUMENTS

| 9,997,186 | B1* | 6/2018 | Bhargava ............. G11B 5/6029 |
| 11,043,235 | B2 | 6/2021 | Mendonsa |
| 11,164,598 | B1 | 11/2021 | Kashyap |
| 2019/0347020 | A1 | 11/2019 | Allo |
| 2024/0005952 | A1 | 1/2024 | Mendonsa |

OTHER PUBLICATIONS

Kryder, "Ultra-High Density Recording Technologies", pp. 457-476.

* cited by examiner

*Primary Examiner* — Nabil Z Hindi
(74) *Attorney, Agent, or Firm* — Mueting Raasch Group (57) ABSTRACT

Described are hard disk drives (HDDs) operable for archival applications and utilizing the same mechanical and electrical design of conventional HDDs. The capacity of a conventional HDD may be extended by up to 25% to 40% or more by employing multiple write and/or read spins before declaring success in write and read processes. The multiple write and/or read spins are designed to address the lower reliability that would otherwise result from high density packing of the data, at the cost of reducing performance. The result is an HDD with lower performance at higher capacity without sacrificing reliability and without altering conventional HDD mechanical or electrical design.

20 Claims, 6 Drawing Sheets

| | | |
|---|---|---|
| T1 | first part, first sector | |
| T2 | second part, first sector | |
| T3 | first part, second sector | |
| T4 | second part, second sector | | first split sector (T1, T2)
second split sector (T3, T4)

FIG. 7

HIGH-DENSITY ARCHIVAL STORAGE USING CONVENTIONAL HARD DISK DRIVE ARCHITECTURE

This disclosure relates to hard disk drives and archival storage.

SUMMARY

In accordance with certain aspects, the present disclosure provides methods for operating conventional HDDs in a high-density archival storage mode. Conventional HDDs are configured to store data on a spinning magnetic disk using a read/write head, and are configured to simultaneously meet pre-defined specifications for an areal density metric, a performance metric, and a reliability metric (such as an unrecoverable error rate). The high-density archival storage mode methods include writing data to the HDD at a density that exceeds the pre-defined specification for the areal density metric, and increasing the command completion times to thereby reduce performance below the pre-defined specification for the performance metric and to maintain reliability within the pre-defined specification for the reliability metric.

In certain aspects, increasing command completion times includes using a multiple spin write process, for example one that emulates a TDMR type write process.

In certain aspects, the multiple spin write process includes performing one or more of: writing data in accordance with an SMR recording scheme having one adjacent track write and sector lengths configured to reduce inter-sector gap overhead, to improve ECC efficiency, and/or to mitigate media signal-to-noise; writing always-valid outer codes that can be relied upon for data recovery; and performing read spins during write processes.

In certain aspects, increasing command completion times includes storing the data in a cache prior to writing the data to the spinning magnetic disk, and further includes verifying the data by reading the data back from the spinning magnetic disk prior to removing the data from the cache.

In certain aspects, increasing command completion times includes using a multiple spin read process, such as one that emulates a TDMR type read process.

In certain aspects, increasing command completion times includes performing one or more of: readback data verification and correction using multi-dimensional error correcting codes; readback data verification and correction using variable error correcting codes; increasing seek settle times more than 25% as compared to the conventional HDD; and using write until failure processes.

In certain aspects, writing data to the spinning magnetic disk at a density that exceeds the pre-defined specification for the areal density metric is confined to selected regions on the spinning magnetic disk, such as within zones defined by radial distance from the center of the spinning magnetic disk. The selected regions may be determined by one or more of user preference, application, or workload.

In certain aspects, the HDD may be operated in a conventional storage mode at data densities within the pre-defined specification for the areal density metric for an initial period of data ingress, and then operating the HDD in the high-density archival storage mode. For example, the initial period of data ingress may proceed until a capacity limit for the spinning magnetic disk is reached.

In accordance with certain aspects, the present disclosure provides HDDs that include rotating magnetic storage media including data stored in one or more high-density storage regions of the rotating magnetic storage media. Controller electronics of control writing data to and reading data from the rotating magnetic storage media via a recording head positioned proximate to a surface of the rotating magnetic storage media, and a buffer stores write-verification information for data to be written to the rotating magnetic storage media. For all data stored in the one or more high-density storage regions of the rotating magnetic storage media, the controller is configured to read back and verify such data from the rotating magnetic storage media prior to purging write-verification information for said data from the buffer.

In certain aspects, the rotating magnetic storage media is a disk having zones defined by radial distance from the center of the disk, and the one or more high-density storage regions have locations that relate to one or more of the zones.

In certain aspects, the write-verification information is one or more of a cached copy of the data to be written and error correction information for the data to be written.

In certain aspects, the controller is configured to use multi-dimensional error correction codes during read back and verify. The multi-dimensional error correction codes may include a longitudinal down-track ECC parity and ECC parity data from adjacent data tracks.

In certain aspects, the rotating magnetic storage media stores data at conventional storage densities in conventional storage regions outside of the one or more high-density storage regions, and the controller is further configured to use the convention storage regions as a data cache.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

The present disclosure relates to archival storage and to the design and use of hard disk drives (HDDs) for archival storage applications. The archival storage market presents a mix of challenges and considerations that are unique as compared to conventional HDD storage applications. Conventional HDDs are architected to strike a careful balance among areal density capability (ADC), performance (for example, command completion time), and data retrieval reliability (for example, unrecoverable error rate), all while keeping costs low and ensuring sufficient device lifetimes. Typically, this involves specifying performance and data reliability targets, and then optimizing ADC given those constraints.

In the archival storage market, the balance among these characteristics is shifted, placing a premium on reduced cost per unit of storage while allowing performance to be sacrificed. Such considerations have given rise to magnetic storage devices designed specifically for archival storage, often involving limiting the number of recording heads or other components to reduce costs, and/or limiting disk spin rates to increase data density. Examples include the write once read many (WORM) drives disclosed in US20190347020A1, the jukebox-style magnetic disk storage drives disclosed in US20240005952A1, and the elevator-style storage drives disclosed in U.S. Ser. No. 11/043,235B2. All of these devices are designed to have mechanical systems and/or electronic systems that differ from those found in conventional HDDs. For the purposes of this disclosure, the term "conventional HDD" means a hard disk drive device that conforms to standard specifications for general use, and that is mass manufactured and readily commercially available. Examples of conventional HDDs include drives that typically rewrite data in a single disk rotation, often referred to as "conventional magnetic recording" or CMR HDDs, and those that typically rewrite bands of data sequentially with each write to the band typically occurring in a single disk rotation, often referred to as "shingled magnetic recording" or SMR HDDs, as well as combinations and variations thereof.

In accordance with the present disclosure, archival HDDs can be designed without needing to alter the mechanical or electrical systems that exist in conventional HDDs. Such archival HDD designs may therefore be able to leverage existing components, manufacturing processes, and assembly techniques used in conventional HDDs. In accordance with various aspects of the present disclosure, archival HDDs can be designed from the standpoint of increasing ADC beyond where data retrieval reliability can be maintained, and then throttling back the performance to restore sufficient data reliability. In other words, without changing the fundamental mechanical configuration and electrical design of a conventional HDD, a high-density archival storage mode can be realized by writing data to the spinning magnetic media at densities that exceed conventional ADC specifications, and then compensating by increasing command completion times, thus reducing performance below that of conventional HDDs while maintaining data reliability metrics such as unrecoverable error rate (UER) within acceptable or specified levels. In accordance with various aspects, increasing command completion times may involve utilizing one or more of multiple spin write processes, multi-dimensional error correcting codes (ECC), variable error correcting codes, increasing seek settle times more than 25% than a conventional HDD, intelligent write processes, multiple spin read processes, read verification and correction processes including always read-after-write (RAW), and writing until failure processes. The drive realizes additional ADC gains (as compared to conventional HDD counterparts) via changes in servo patterns including storing repeatable runout (RRO) correction information as data sectors instead of servo data, and eliminating redundant information in the servo pattern such as multiple track identification marks per revolution.

By employing multiple write and/or read spins in the write and read recording process, methods in accordance with the present disclosure can increase the storage capacity of archival HDDs over their conventional HDD counterparts, for example by 20% or more, 30% or more, 35% or more, or 40% or more. This comes at the cost of reducing drive performance and increasing command completion times, which is often acceptable in archival storage market segments where data retrieval is infrequent.

As such, the present disclosure describes HDD designs targeting archival and "cold data" markets by utilizing the same mechanical and electrical design of a conventional HDD. The capacity of the conventional HDD is increased by employing multiple write and read spins before declaring success in write and read processes. Capacity increases of up to 40% or more may be achieved by compromising drive performance with multiple write/read spins. As data is packed more tightly into HDD tracks, it will result in errors during both reads and writes, and thus reduced reliability, unless performance is reduced to allow detection and correction of reliability issues. For archival storage markets, this may be a desirable tradeoff.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

Figure 1:
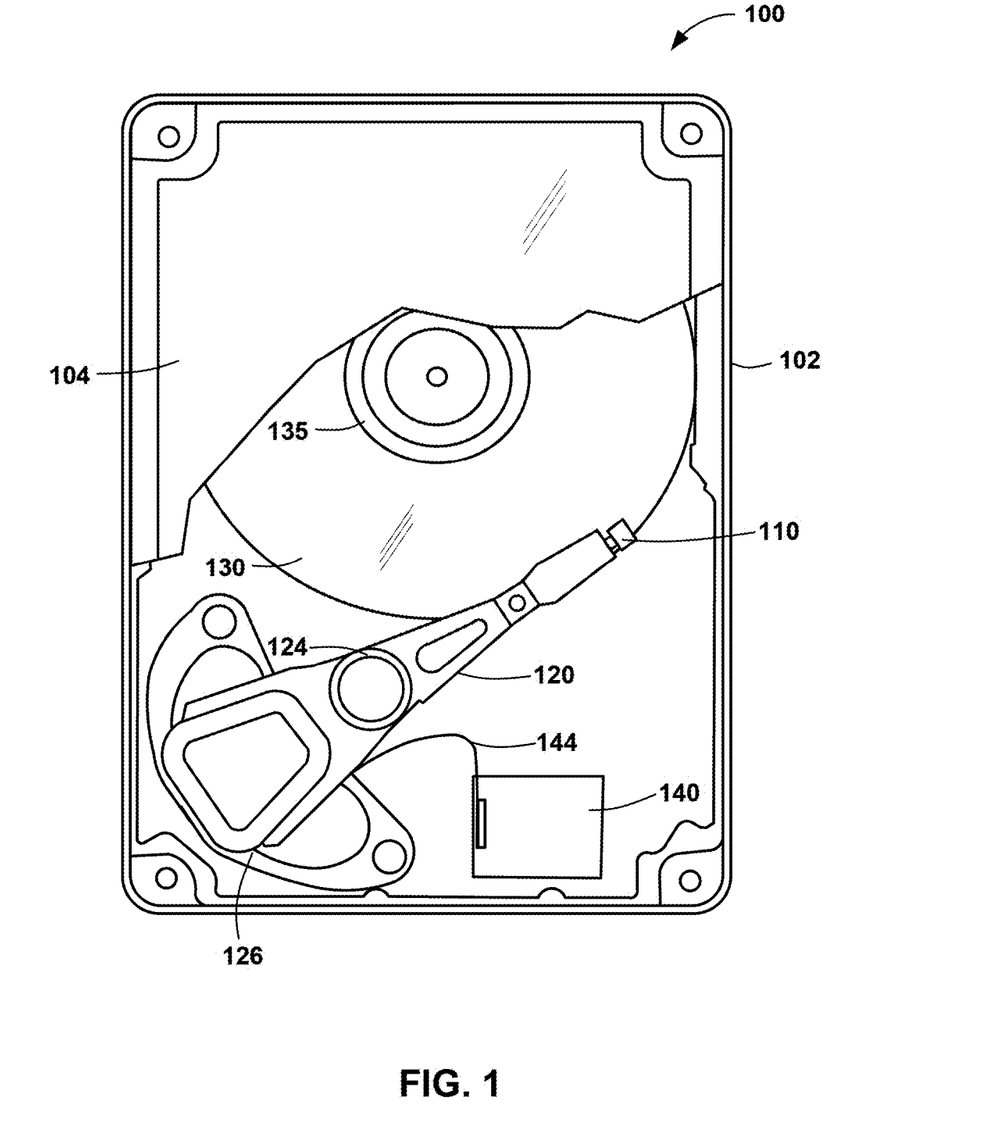
FIG. 1 is a schematic representation of a hard disk drive as may be used with various aspects of the present disclosure.

FIG. 1 schematically depicts a typical conventional HDD device 100 that includes a recording head 110 having read and write capabilities. Recording head 110 is disposed on the end of an actuator arm 120 that is rotationally movable around a pivot 124 by use of a voice coil motor 126. The recording head 110 is positioned in close proximity to the surface of magnetic media disk 130 such that the recording head can write data to and read data from tracks on the magnetic media 130 as it spins by action of a spindle motor 135. Controller electronics 140 may be coupled to the voice coil motor 126 and recording head 110 via a flex cable 144 that connects to traces on the actuator 120. Preamp electronics (not indicated) are typically disposed close to the recording head 110 for conditioning signals to and from the recording head. Controller electronics 140 may also be coupled to spindle motor 135, and thereby control the spinning of the media disk(s) 130 along with the movement of the actuator 120 and the reading and writing of data via recording head 110. The internal components of conventional HDD 100 are contained within an enclosure 102, including cover 104, which is shown partially cut away to reveal the internal components. A host device can communicate with conventional HDD 100 through a standardized interface (not shown).

Conventional HDD device 100 can operate on any magnetic recording principle, whether that be conventional magnetic recording (CMR), shingled magnetic recording (SMR), heat-assisted magnetic recording (HAMR), or any other type of recording technique, including combinations thereof. While the actuator 120 is shown to move rotationally, the present disclosure is not limited to how the actuator moves and encompasses linear actuation and multiple rotary actuators. Likewise, recording heads such as recording head 110 can be provided on movable or stationary rails, or in any other suitable manner now known or later contemplated.

In accordance with the present disclosure, conventional HDD 100 may be operated in a high-density archival HDD mode without needing to alter any of the components or arrangements as shown and discussed in reference to FIG. 1, or any of the mechanical or electrical architectural designs represented thereby. To help understand how a conventional HDD may be operated in a high-density archival mode, it is useful to first describe the process for writing and reading data in a conventional HDD.

In a conventional HDD, the drive receives requests to read or write one or more data blocks, and the requests include a starting logical block address (LBA) and block length. For write requests, the data block is divided into small pieces, called sectors, that are encoded and written onto the spinning magnetic storage media using a write head. Once the block is received, it is generally written to its addressed storage location soon thereafter, though it may be temporarily cached in DRAM or electronic memory to optimize drive performance. For read requests, a read head reads the sector from the spinning magnetic media and sends the data through a detector and decoder that correct errors and conditions the data in the format of one or more data blocks that can be communicated to a host. Once the block is requested, it is assumed that it will be read back within a predefined commend completion time (CCT) window.

Conventional HDDs are designed to maximize the drive capacity, or ADC, for a given reliability target and performance requirement. Reliability targets are often expressed in terms of unrecoverable error rate (UER). Performance requirement metrics may be expressed in terms of read and write times and CCTs, and may be further delineated based on workload type, namely sequential or random.

Conventional HDDs may be considered to be random access drives, which includes the following characteristics. Logical blocks are written to disk sectors at logical-block-addressed locations that are specified by the customer (or host). The hard drive stores these blocks in predetermined disk sector locations within recording zones that can be further described by physical storage region of the media, for example in reference to the outer diameter (OD), middle diameter (MD), or inner diameter (ID) of a given media disk surface. It is possible for blocks to be written to the same location multiple times. The writing of blocks/sectors on the media surface immediately upon receiving a write request leads to "blind writing," which in essence assumes that the data was written as desired, overwriting any previously written data, and that the latest data can be later read back from the media reliably. Moreover, the blind writing of blocks/sectors further assumes that previously written data on adjacent tracks and sectors are not significantly degraded in the process. To ensure that the blind write assumptions are correct, the drive is "padded" with bit spacing recording density margins in both the down-track direction (bits per inch, or BPI) and cross-track direction (tracks per inch, or TPI), as well as with additional bit error rate (BER) margin. Moreover, when reading sectors upon receiving read requests, advanced signal processing, error detection, channel coding, error correction, and further error recovery steps may be used to recover the data.

As previously noted, archival storage markets demand more drive capacity for a given cost, but often without strict requirements on drive performance. In accordance with the present disclosure, the mechanical and electrical designs used in conventional HDDs may be retained, and the drive is operated differently to achieve a higher ADC or drive capacity, and in some cases much higher, by reducing drive performance. The performance of a drive may be reduced by allowing the use of multiple disk spins during write and/or read processes. During the multiple write and/or read spins, processes may be performed that enable higher data density in the drive, for example: SMR with one adjacent track write (ATW) and longer sector sizes than typical SMR sectors to reduce inter-sector gap overhead, to improve ECC efficiency, and/or to mitigate media signal-to-noise (SNR) issues; always-valid outer codes that can be relied upon for data recovery; read spins during write process, also known as continuous read after write (C-RAW); multiple read spins during read processes, for example to emulate two-dimensional magnetic recording (TDMR) of an actuator at zero skew angle to the recording track; and reducing TPI, BPI, and/or BER margins.

By utilizing multiple write and/or read spins along with various processes that enable higher ADC, a conventional HDD can be operated in a high-density archival storage mode that in essence turns a random access CMR drive into a block-based sequential drive that incorporates intelligence into the write process. As such, instead of assuming data is properly written and relying upon data reliability measures to add design margin, operating in high-density archival storage mode uses intelligent writing to make sure the data is properly written without destroying already written neighboring data. Moreover, the high-density archival storage mode may implement TDMR read processes by reading one or more adjacent tracks. Still further, the high-density archival storage mode may reduce the margins from what they were under conventional "blind write" operation. Note that the high-density archival storage mode could be either host-managed or drive-managed, and the drive may optionally support zoned namespaces.

Figure 2:
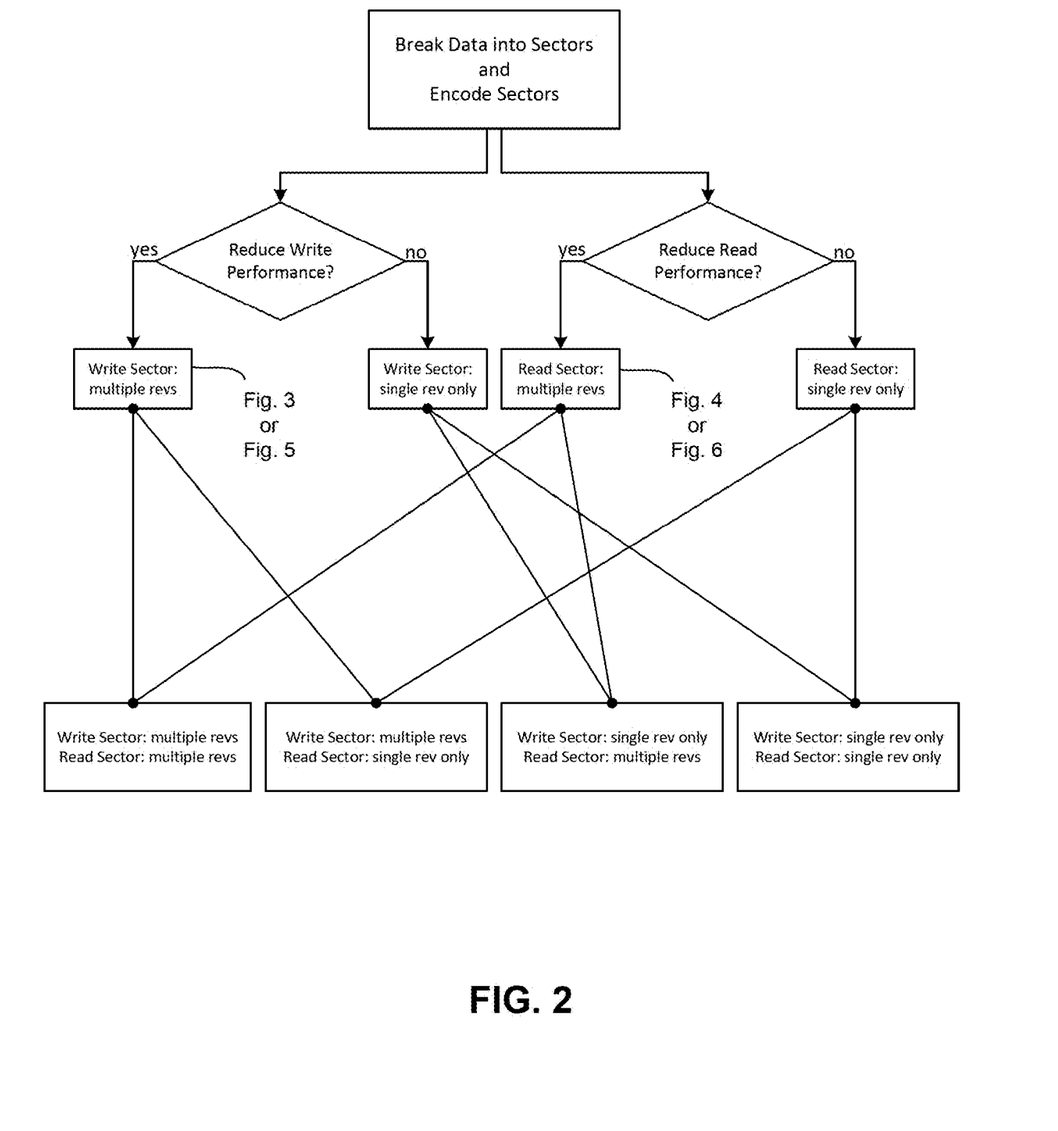
FIG. 2 is an example decision tree for determining the use of multiple spin read and write processes in accordance with various aspects of the present disclosure.

FIG. 2 is a decision tree indicating how various combinations of single and multiple spin reads and writes may be utilized in the context of methods of the present disclosure. The data to be written is broken into sectors and encoded. Then it is determined whether or not to reduce write performance (from the host's perspective) by utilizing multiple spin write operations (denoted "multiple revs" for multiple revolutions) and/or whether or not to reduce read performance (from the host's perspective) by utilizing multiple spin (rev) read operations. These decisions may be made based on user preference, based on a particular application (for example, archival mode versus conventional mode), based on workload, and so forth. The decision on whether to reduce write performance and/or read performance may also be made for particular zones on the magnetic media. For example, any or all of the OD, MID, or ID may be designated for high-density archival mode storage, with zones not so designated being recorded conventionally. Such a decision can be made at other occasions during the storage device's life, such as when the drive is manufactured, when different firmware is loaded upon the drive, and when the drive is formatted. As indicated in FIG. 2, for particular applications, use cases, and/or zones, multiple rev and single rev writes and reads can be utilized in all their various combinations.

Figure 3:
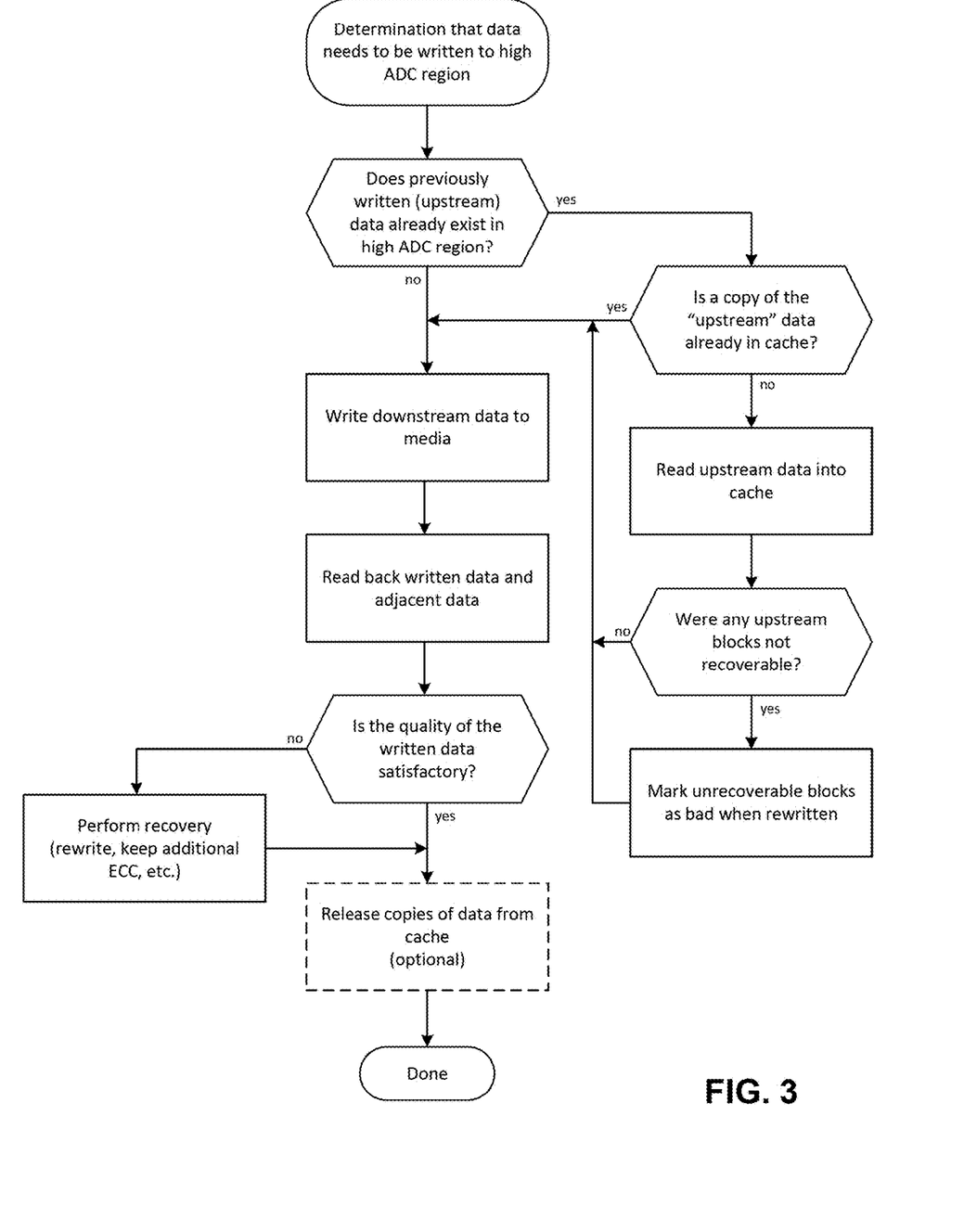
FIG. 3 is a flow chart depicting a generalized multiple spin write process in accordance with various aspects of the present disclosure.

FIG. 3 shows a flow chart of an exemplary multiple rev write process that may be utilized in various aspects of the present disclosure. In FIG. 3, a determination has been made that blocks of data are to be written to the high-density region of the media. This determination may be made by the drive or the host. Since the data are to be written at or near the highest TPI capability of the drive, there exists an elevated chance of corrupting previously written (upstream) data. Therefore, the upstream data for at least the adjacent track are read into the cache to protect against possible corruption during the writing of the new blocks of data. Blocks of upstream data that are unrecoverable (if any) are noted, and if the upstream data must later be rewritten, these unrecoverable blocks are either skipped during the re-write or are deliberately written back as unrecoverable. The new blocks of data are then written to the media. Upon writing the new blocks of data to the media, the drive re-reads the newly written data along with the upstream data to determine whether the written data is of sufficient quality. If the data are satisfactory the process is complete. If the data are not satisfactory, recovery is performed. Recovery can include rewriting the data, rewriting the data and the upstream data (in which case the data on the next upstream track is preserved), storing additional ECC for any poorly written data blocks, storing copies of any poorly written data blocks elsewhere, returning an error for the write, abandoning the write and keeping the data in the cache, or various combinations of these. When the write is complete, any copies of pertinent data in the cache may optionally be released.

While not indicated in FIG. 3, the drive may calculate, update and store additional ECC parity as part of the write operation. Such ECC parity can be computed for a number of blocks in a rotation (that is, in the down-track direction). Such ECC parity can also be computed for a number of blocks in a cross-track fashion. Cross-track ECC may be stored on the media as the final track in a band of shingled tracks or can be kept elsewhere, including in the cache. These parities may be considered as "outer code" (or "outer codes"). If both down-track ECC parity and cross-track ECC parity are stored, this is referred to as a "2D" (two-dimensional) outer code ECC system.

Figure 4:
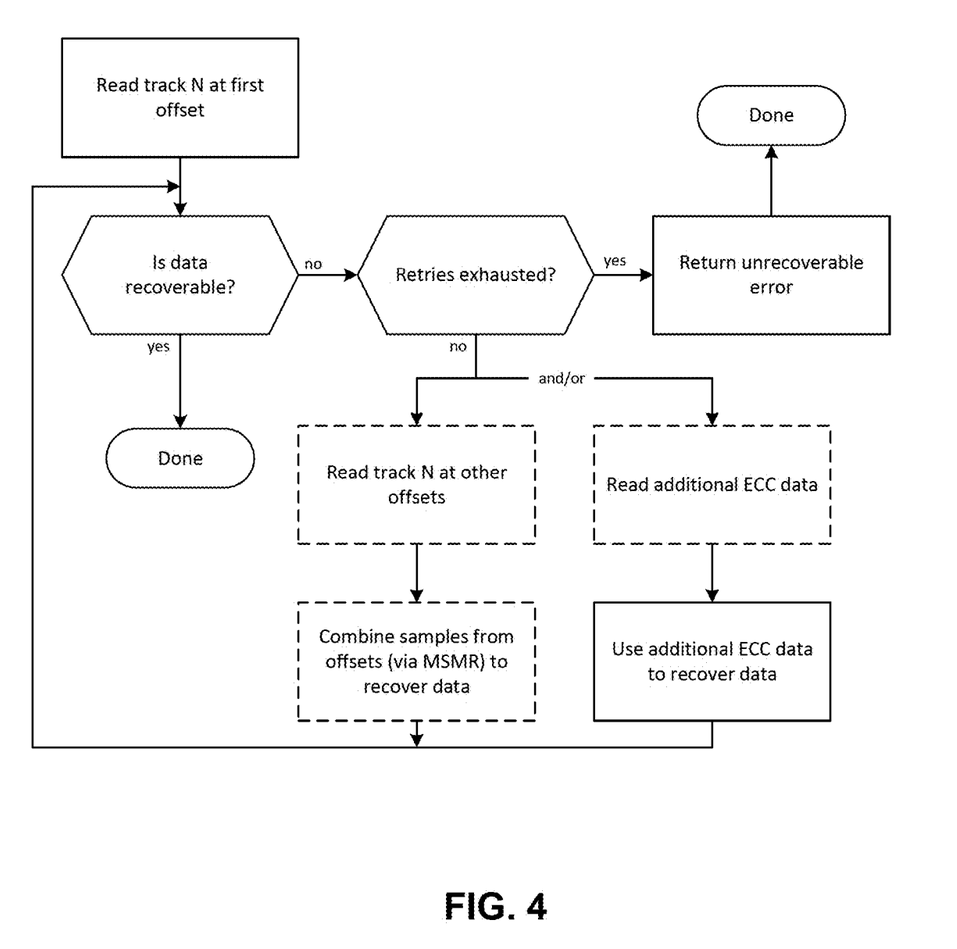
FIG. 4 is a flow chart depicting a generalized multiple spin read process in accordance with various aspects of the present disclosure.

FIG. 4 shows a flow chart of an exemplary read process that may be utilized in various aspects of the present disclosure. In FIG. 4, it is assumed that a command to perform a read operation to the high-ADC region of the media has been received. For example, such a read command may be a host command or may come from the write process shown in FIG. 3. In FIG. 4, a read is first attempted at a predetermined data cross-track offset. Sampled data from the read operation are kept in memory and the blocks are subjected to conventional error correction (for example, Viterbi detection into low-density parity code correction). If the blocks are recoverable, they are returned to the requester. If the blocks are not recoverable, various retry operations are optionally performed. Optional retry operations may include reading and re-reading data at the same or other offsets and combining these samples with earlier samples using Multi-Sampled Magnetic Recording (MSMR) signal processing techniques. If additional ECC data have been stored, these data may be read back and used to perform, or assist in, block recovery. If successful, the requested data are returned to the requester. Upon exhausting all retry operations, if any blocks remain unrecoverable the process will return an "unrecoverable data error" to the requester. Exhausting retry operations may occur after a certain amount of time, after a certain amount of retries, and/or after conducting all available recovery actions with no additional change to data recoverability.

Figure 5:
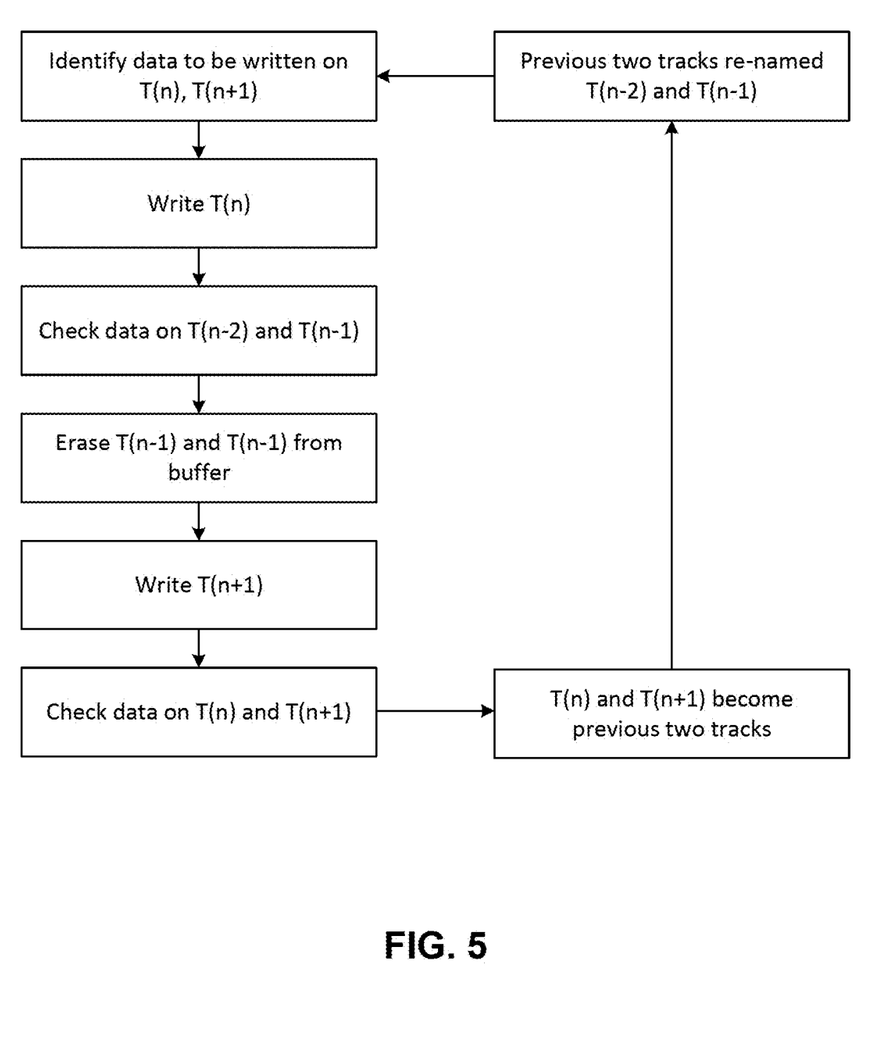
FIG. 5 is a flow chart depicting an example of a multiple spin write process under a TDMR recording scheme in accordance with various aspects of the present disclosure.

FIG. 5 shows a flow chart of a TDMR type multiple rev write process that may be utilized in various aspects of the present disclosure. Encoded sectors of data are received to be written. Each sector is split into two parts, a first part to be written on a first track, called T(n), and the second part to be written on a second track adjacent to the first track, called T(n+1). The first part of each sector is then written on track T(n) while the second part of each sector is buffered for later writing to track T(n+1). Before writing to track T(n+1), the data on the previous two tracks are checked, those tracks being denoted T(n−2) and T(n−1). Upon reading the data on T(n−2) and T(n−1), any sectors that cannot be decoded successfully are identified and those locations are assigned with the label "garbage." Next, sectors written on tracks T(n−2) and T(n−1) may be erased from the buffer, taking care to retain the sectors assigned as "garbage" in the buffer when variable outer code is not used. When variable outer code is used, then sectors assigned as "garbage" are recovered using the outer code, and the parity data is retained in the buffer to be written later while all the sectors written on tracks T(n−2) and T(n−1) are erased from the buffer. At this point, the second part of each sector received for writing can be written on track T(n+1). The data written to tracks T(n) and T(n+1) is then read back, for example using a read after write process. Any sectors that cannot be decoded successfully are identified and those locations are assigned the label "garbage." When this is complete, the data written on tracks T(n) and T(n+1) are well-characterized and still retained in the buffer to ensure full reliability. New data for writing can now be received, with tracks T(n) and T(n+1) becoming the previous two tracks and being re-named T(n−2) and T(n−1).

Figure 6:
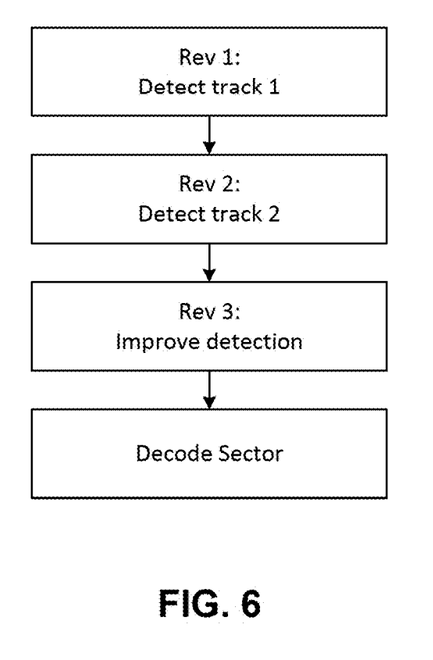
FIG. 6 is a flow chart depicting an example of a multiple spin read process under a TDMR recording in accordance with various aspects of the present disclosure.

FIG. 6 shows a flow chart of a TDMR type multiple rev read process that may be utilized in various aspects of the present disclosure. The process shown in FIG. 6 assumes that data has been encoded into sectors, with each sector being split into two parts, and with each first and second part being written on adjacent first and second tracks, respectively. On the first revolution of the magnetic media disk, the first track is read, which involves detecting all the first parts of the sectors with quality monitoring of the detection process. On the second revolution of the magnetic media disk, the second track is read, which involves detecting all the second parts of the sectors with quality monitoring of the detection process. A comparison is made between the first track and the second track to determine which track was recorded with worse quality. On the third revolution, the reader is positioned to read the one of the first and second tracks that was determined to have worse quality, and that track is re-read. The results of the re-read are used to improve detection quality. Finally, the sectors are re-formed using the bits detected from the first track and second track, and the re-formed sectors are decoded.

In systems and methods of high-density archival mode recording in accordance with various aspects of the present disclosure, expected ADC gains can be determined by measuring the contributions from various ADC enabling processes in a spinstand environment and correlating to ADC gains expected for a drive environment. In particular, converting the drive to SMR from CMR yields 4.8% more ADC on a spinstand (11.1% in a drive environment), having one adjacent track write versus six yields another 5.5% more ADC on a spinstand (5.9% in a drive environment), implementing C-RAW yields another 6% more ADC on a spinstand with already existing margins, and implementing TDMR with three readers at zero skew gives another 10% more ADC on a spinstand. Moreover, since intelligent writing ensures proper writing of data without destroying already-written data, the margins normally required for "blind write" are not needed, and there may be opportunities to additionally increase ADC by further reducing TPI, BPI, and BER margins. Without such additionally reduced margins, the cumulative addition of the ADC gains for the items identified above range from about 28.9% to 37.2%. Including additionally reduced margins, it is expected to be able to achieve ADC improvement of 35% to 40% above conventional HDDs using the same mechanical and electrical design of the conventional HDD operated in a high-density archival mode.

In a particular example, a conventional 7200RPM CMR HDD operating at its own ADC was used for applying methods in accordance with certain aspects of the present disclosure. In this case, three revolutions (revs) were employed during the write process, including one write spin and two read spins. Moreover, during the read process, three read spins were employed. This resulted in a high-density archival mode drive having about 35% to 40% higher ADC than the corresponding conventional HDD, and operating at 7200RPM for seek performance and an effective 2400RPM for data retrieval and recovery. The write and read processes used are referred to as "Intelligent Write" and are further described in the discussion that follows.

Figure 7:
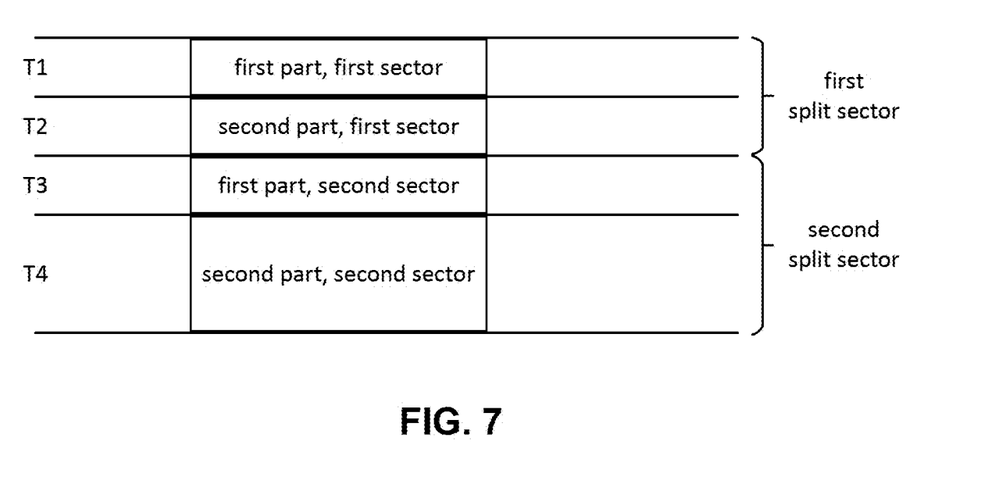
FIG. 7 schematical shows the relationship between adjacent tracks during multiple spin writing and reading in accordance with various aspects of the present disclosure.

FIG. 7 schematically depicts four adjacent tracks, T1, T2, T3, and T4. The Intelligent Write process is illustrated in the writing of data on tracks T3 and T4 in accordance with two-dimensional magnetic recording (TDMR) technology. The first split sector is already written on tracks T1 and T2 with the first part written on track T1 and the second part written on track T2. In this illustration, it is assumed that the data of the first sector is also stored in buffer, for example because the data belongs to the same sequence of data being written or because it was already read in the buffer during an earlier two revs. In step 1, TDMR technology is used to encode the data sectors (in this case called the second sector) and to identify the data to be written on tracks T3 and T4 (the first part of the second sector, and the second part of the second sector). In step 2, the first part of the second sector is written on track T3, and the data on tracks T1 and T2 are read and checked against the data in the buffer. During these spins, the servo system can be used to ensure the track trajectory for track T3 is aligned with that of tracks T1 and T2. In step 3, the second part of the second sector is written on track T4, and then the data on tracks T3 and T4 are read and checked against data in the buffer and using similar track trajectories. In three spin reading, when the data on tracks T1 and T2 are read back, the third spin can be used to read again the track with worse quality out of T1 and T2.

When performing these steps, various methodologies may be used for verifying reads and for data correction. Options include re-writing a track, which may involve re-verification of adjacent tracks and possibly re-writing the track at a lower linear density (often referred to as KFCI, or kilo flux change per inch). Also, any poorly written bits can be noted and stored along with error correction in outer codes either on the next track or in a designated storage location. This storage location could be on the disk, on a different disk, in a separate device or nonvolatile (NV) cache such as flash. It is also possible to store all the data for the data object/block at the end of the data object/block or in a designated location as part of the data object/block. Other options involve re-writing tracks at lower KFCI, as well as multiple reads of the track in a manner similar to multi-sensor magnetic recording (MSMR), which is a subset of TDMR where multiple readers read the same track. When verifying reads on the two tracks, the track exhibiting the worse quality of the two is re-read during the third read spin.

In certain applications, it may be possible to implement methods in accordance with the present disclosure on CMR drives by using multiple revs to read adjacent tracks and verify the written and adjacent tracks, and then applying the correction to outer codes in a designated correction storage location similar to what was described above.

In certain applications, it may be advantageous to find a maximum KFCI. For example, tracks may be continuously re-written at ever higher KFCI until failure, and then step back the KFCI and/or store errors in an outer code.

In certain applications, tracks per inch (TPI) may be maximized by squeezing in more and more shingled tracks in SMR. As such, it may be possible to continuously re-write a track in a manner that encroaches more and more on the neighboring previously written SMR track using similar track following trajectories. The objective would be to keep squeezing until a limit in errors and/or readability is reached for the adjacent track, and then store the corrections in the form of outer codes or error correction as needed to meet the requirement in the designated error correction data storage area.

In certain applications, it is possible to designate zones in the drive such that certain zones are recorded in high-density archival mode using multiple revs per read and/or write, while other zones are designated for conventional SMR/CMR recording. For example, the outer zones on a disk could be designated for high-density archival recording while the inner zones are designated for conventional operation. Since the outer zones normally have double the throughput as the inner zones, such zone designation may help maintain a more consistent throughput. Alternatively, the outer zones may be used for conventional operation to provide a high throughput zone, with the inner zones being archival. Other combinations are possible, as will be appreciated. The conventional operation zones may be used as a media cache so that incoming data are stored quickly and then later moved to the archive region as a background operation.

Zone designation can be done in conjunction with SMR and CMR flex architecture as well. It is possible to have the drive function like a conventional drive during an initial ingest of data, and then once the drive reaches a desired level of stored data (for example, near full capacity) under standard CMR/SMR conditions, then the data densification process using methods in accordance with the present disclosure may begin. For example, data densification can occur offline or during a downtime after the initial data ingest. This may be particularly useful for archival use cases where the data is "write few, read few." Such a process can be initiated by the host or the drive, and can make use of time and densification estimates computed based on algorithms by the host or the drive. After data densification, the freed-up capacity may be written again in either normal CMR/SMR mode at standard ingest rates, or the drive may continue using the slower, densified archival writing process. In accordance with various aspects of the present disclosure, it is also possible to select between multiple rev read processes and single rev read processes for different zones. Moreover, the level of densification used in different zones may be controlled by the host or by the drive, and may further be controlled in chunks or bands (such as for SMR).

In certain implementations, changes to drive mechanics such as the utilization of multiple heads per recording surface can reduce the number of revs needed during multiple rev processes, thereby improving throughput. Multiple heads per surface includes heads on the same actuator arm or different actuator arms. Moreover, zero skew options, such as linear actuators, may enable easier implementation of such systems on a single arm. Top hat or other MSMR architectures can be implemented to reduce the number of revs and benefits from zero skew implementations. Parallel channel architectures can be used to increase throughput when multiple heads are used per surface.

For archival storage, power consumption is an important factor. Since in many implementations, the various methods of the present disclosure employ read verification, and since reads may be power intensive especially when recovering data, it may be possible to perform simpler read verifications. For example, data may be read while still in discretized form (that is, before error correction, Viterbi detection, and forth) to correlate with known desired signals. If the correlation passes a desired threshold, then verify the write as good. If not, then continue with decoding the signal to determine where the errors occur. It is possible to determine regions of lower correlation to determine where to look rather than process the whole sector. This may assist in providing power savings and time savings.

In certain aspects, it may be possible to spend revolutions estimating servo RRO correction values, known as ZAP (zero angular momentum) then writing or reading the data. This can optionally be used to reduce and/or eliminate the manufacturing test time required to calculate and store the ZAP data. Storing ZAP fields in data sectors reduces media space compared to storing ZAP in servo wedges, as is often done conventionally. By storing the ZAP fields in data sectors, the ZAP fields are stored in a higher density compared to storing in servo wedges. Moreover, their values can be more easily updated and further refined with the collection of additional RRO samples from further rotations of a particular track.

In certain aspects, it may be possible to implement methods in accordance with the present disclosure at a system level. For example, the storage of error correction codes could be done on a separate storage drive or NV storage medium. In certain system implementations such as a PODS (petabytes of drive storage), read verify can be done in the drive and the errors can be communicated to the system controller so that the system can apply the error correction across system when striping the data. This may require fewer revs to correct for the data when verification fails because it is handled at the system level. This methodology may be implemented in multi-drive systems, in RAID systems, at a server level, or at a data center level.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/of" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A method for operating a conventional HDD in a high-density archival storage mode, the method comprising:
   providing an HDD configured to store data on a spinning magnetic disk using a recording head, the HDD having an architecture configured to simultaneously meet predefined specifications for an areal density metric, a performance metric, and a reliability metric;

writing data to the spinning magnetic disk at a density that exceeds the pre-defined specification for the areal density metric; and increasing command completion times to thereby reduce performance below the pre-defined specification for the performance metric and to maintain reliability within the pre-defined specification for the reliability metric.

2. The method of claim 1, wherein increasing command completion times comprises using a multiple spin write process.

3. The method of claim 2, wherein the multiple spin write process includes emulating a TDMR type write process.

4. The method of claim 2, wherein the multiple spin write process includes performing one or more of:
  writing data in accordance with an SMR recording scheme having one adjacent track write and sector lengths configured to reduce inter-sector gap overhead, to improve ECC efficiency, and/or to mitigate media signal-to-noise;
  writing always-valid outer codes that can be relied upon for data recovery; and
  performing read spins during write processes.

5. The method of claim 1, wherein increasing command completion times comprises storing the data in a cache prior to writing the data to the spinning magnetic disk, and further comprises verifying the data by reading the data back from the spinning magnetic disk prior to removing the data from the cache.

6. The method of claim 1, wherein increasing command completion times comprises using a multiple spin read process.

7. The method of claim 6, wherein the multiple spin read process includes emulating a TDMR type read process.

8. The method of claim 1, wherein increasing command completion times includes performing one or more of: readback data verification and correction using multi-dimensional error correcting codes; readback data verification and correction using variable error correcting codes; increasing seek settle times more than 25% as compared to the conventional HDD; and using write until failure processes.

9. The method of claim 1, wherein writing data to the spinning magnetic disk at a density that exceeds the pre-defined specification for the areal density metric is confined to selected regions on the spinning magnetic disk.

10. The method of claim 9, wherein the selected regions are zones defined by radial distance from the center of the spinning magnetic disk.

11. The method of claim 9, wherein the selected regions are determined by one or more of user preference, application, or workload.

12. The method of claim 1, further comprising operating the HDD in a conventional storage mode at data densities within the pre-defined specification for the areal density metric for an initial period of data ingress, and then operating the HDD in the high-density archival storage mode.

13. The method of claim 12, wherein the initial period of data ingress continues until a capacity limit for the spinning magnetic disk is reached.

14. The method of claim 1, wherein the reliability metric is an unrecoverable error rate.

15. A hard disk drive comprising:
  rotating magnetic storage media including data stored in one or more high-density storage regions of the rotating magnetic storage media; and
  controller electronics that control writing data to and reading data from the rotating magnetic storage media via a recording head positioned proximate to a surface of the rotating magnetic storage media; and
  a buffer that stores write-verification information for data to be written to the rotating magnetic storage media,
  wherein for all data stored in the one or more high-density storage regions of the rotating magnetic storage media, the controller is configured to read back and verify said data from the rotating magnetic storage media prior to purging write-verification information for said data from the buffer.

16. The hard disk drive of claim 15, wherein the rotating magnetic storage media is a disk having zones defined by radial distance from the center of the disk, and wherein the one or more high-density storage regions have locations that relate to one or more of the zones.

17. The hard disk drive of claim 15, wherein the write-verification information is one or more of a cached copy of the data to be written and error correction information for the data to be written.

18. The hard disk drive of claim 15, wherein the controller is configured to use multi-dimensional error correction codes during read back and verify.

19. The hard disk drive of claim 18, wherein the multi-dimensional error correction codes include a longitudinal down-track ECC parity and ECC parity data from adjacent data tracks.

20. The hard disk drive of claim 15, wherein the rotating magnetic storage media stores data at conventional storage densities in conventional storage regions outside of the one or more high-density storage regions, and wherein the controller is configured to use the convention storage regions as a data cache.

* * * * *